United States Patent
Daley et al.

(10) Patent No.: US 9,494,405 B1
(45) Date of Patent: Nov. 15, 2016

(54) MEASUREMENT TOOL FOR SERVER RACK

(71) Applicant: International Business Machines Corporation, Armonk, NY (US)

(72) Inventors: Michael E. Daley, Cedar Park, TX (US); Don S. Spangler, Jr., Poughkeepsie, NY (US); Ronald S. Wesely, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/868,585

(22) Filed: Sep. 29, 2015

(51) Int. Cl.
*G01B 3/08* (2006.01)
*G01B 5/14* (2006.01)

(52) U.S. Cl.
CPC .. *G01B 5/14* (2013.01); *G01B 3/08* (2013.01)

(58) Field of Classification Search
CPC .......... G01B 3/08; G01B 3/20; G01B 3/205; G01B 3/42; G01B 5/14; G01B 5/16; H05K 7/14; H05K 7/18
USPC .................................................. 33/542, 809
See application file for complete search history.

(56) References Cited

U.S. PATENT DOCUMENTS

| | | | | |
|---|---|---|---|---|
| 5,699,281 | A * | 12/1997 | Crucius | B65G 1/0421 414/277 |
| 6,298,568 | B1 * | 10/2001 | Johnson | G01B 3/28 33/501.45 |
| 6,655,534 | B2 | 12/2003 | Williams et al. | |
| 7,610,691 | B2 * | 11/2009 | Zhang | G01B 5/18 33/542 |
| 7,640,670 | B2 * | 1/2010 | Zhang | G01B 3/14 33/1 BB |
| 7,874,080 | B1 * | 1/2011 | Morales | G01B 5/0025 33/600 |
| 8,640,352 | B2 * | 2/2014 | Porreca | G01B 3/08 33/464 |
| 8,714,036 | B2 | 5/2014 | Zhang | |
| 2009/0219701 | A1 | 9/2009 | Wu et al. | |
| 2010/0042989 | A1 | 2/2010 | Anand et al. | |
| 2011/0094364 | A1 | 4/2011 | Brown | |
| 2011/0213735 | A1 | 9/2011 | Cao et al. | |
| 2014/0230259 | A1 * | 8/2014 | Zhang | G01B 3/08 33/427 |

FOREIGN PATENT DOCUMENTS

| | | | | |
|---|---|---|---|---|
| CN | 201243429 Y | | 5/2009 | |
| CN | 201815720 U | | 5/2011 | |
| CN | 203031591 U | * | 7/2013 | ............... G01B 3/08 |
| GB | 2256274 A | * | 12/1992 | ............... G01B 3/08 |

(Continued)

OTHER PUBLICATIONS

IBM, List of IBM Patents or Patent Applications Treated as Related, Appendix P, dated Mar. 12, 2016, 2 pages.

(Continued)

*Primary Examiner* — R. A. Smith
(74) *Attorney, Agent, or Firm* — Andrew G. Wakim

(57) ABSTRACT

A structure for measuring server rack dimensions. The structure may include; a center spacer having a slider opening; a top panel fixed to a top surface of the center spacer; a bottom panel fixed to a bottom surface of the center spacer; and a slider in the slider opening of the center spacer, wherein a portion of the slider is between the top panel and the bottom panel, and the slider is horizontally movable between a starting position and an extended position, the starting position is where the slider is closest to the center of the center spacer and the extended position is where the slider is farthest from the center of the center spacer.

20 Claims, 11 Drawing Sheets

(56) References Cited

FOREIGN PATENT DOCUMENTS

| GB | 2438428 A | * | 11/2007 | ............... G01B 3/08 |
| JP | 08136203 A | * | 5/1996 | ............... G01B 3/08 |
| JP | 09026301 A | * | 1/1997 | ............... G01B 3/08 |
| WO | WO 9504915 A1 | * | 2/1995 | ............... G01B 3/08 |

OTHER PUBLICATIONS

Pending U.S. Appl. No. 15/067,757, filed Mar. 11, 2016, entitled: "Measurement Tool for Server Rack", 24 Pages.

Western Safety Products, Inc., "Aldon Track Inspection & Maintenance Equipment", Aldon Rail Inspection & Maintenance Products, Printed on Jun. 17, 2015, 8 pages.

Canford, "Enclosure Systems Rack Ruler", www.canford.co.uk, Printed on Jun. 17, 2015, 1 page.

Delta International, "Grip Gauge Slide", Hi-Shear Inst. & Removal I Gages, http://www.deltaintl.com/Hi%20shear/gages/Grip%20Gauge%20Slide.html, Printed on Jun. 17, 2015, 1 page.

IBM, "Embedded Magnetic Instructions for Easy Rack Attachment and Detachment", An IP.com Prior Art Database Technical Disclosure, Original Publication Date: Jan. 31, 2008, Ip.com No. 000167127, 4 pages.

IBM, "Integrate Rack Mount template into packaging", An IP.com Prior Art Database Technical Disclosure, Original Publication Date: Jul. 22, 2008, IP.com No. 000172964, 2 pages.

Jet Gasket & Seal, orings-online.com a division of Jet Gasket & Seal Co., "O-Ring Sizing Gauge Slide Style National Type Telescoping Size Guide", 1 page, printed on Jun. 17, 2015.

IBM, "Rack installation specifications for racks not purchased from IBM", http://www-01.ibm.com/support/knowledgecenter/9119-MHE/p8had/p8had_oemrack.htm?lang=en, Printed on Jun. 17, 2015, 8 pages.

\* cited by examiner (Related Art) ROUND HOLES (Related Art) SQUARE HOLES

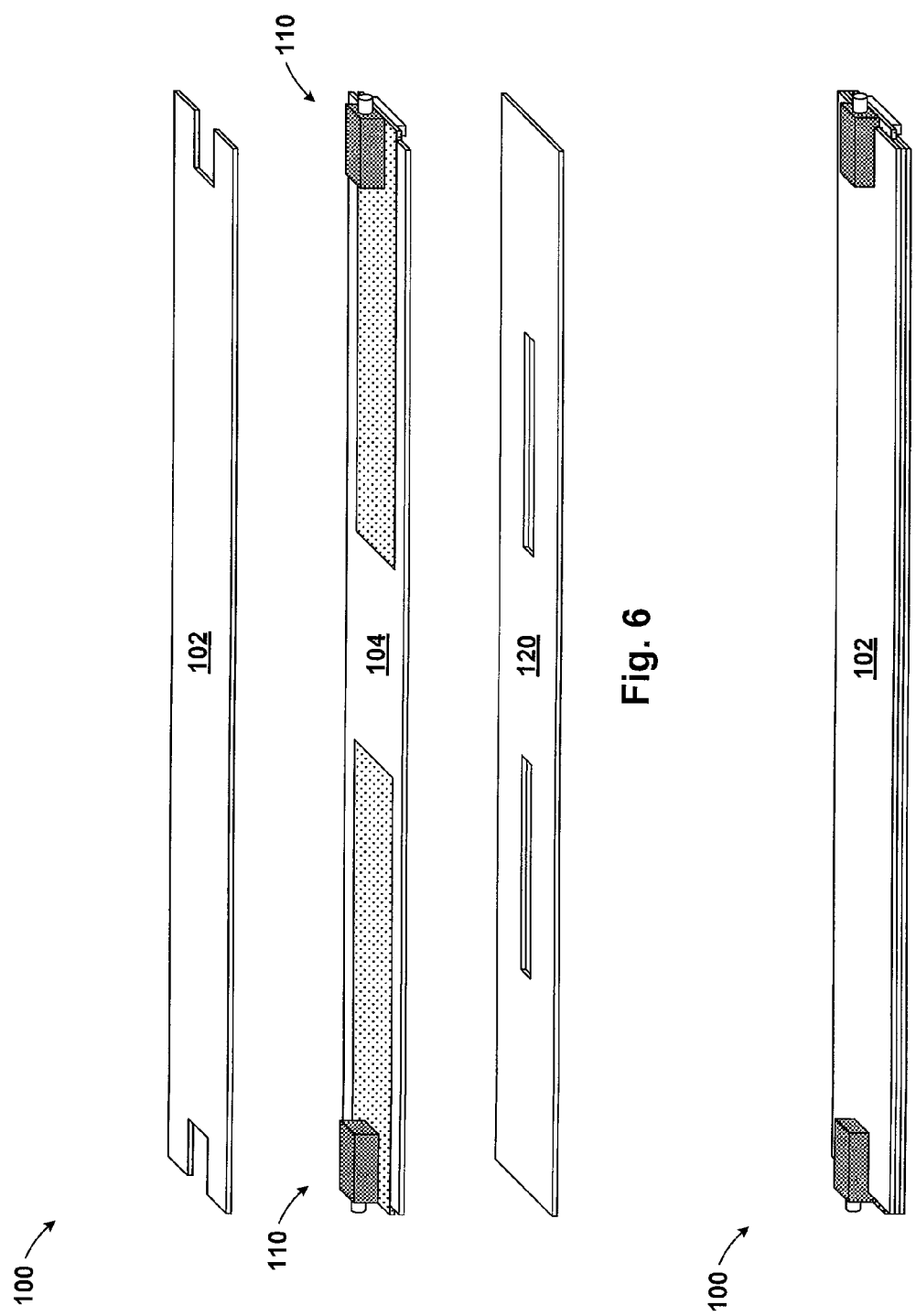

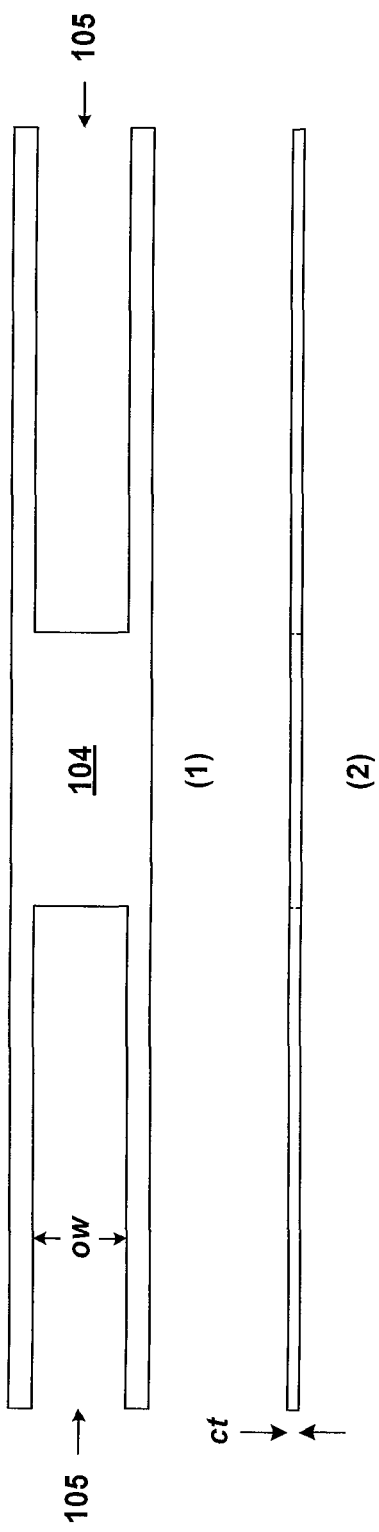
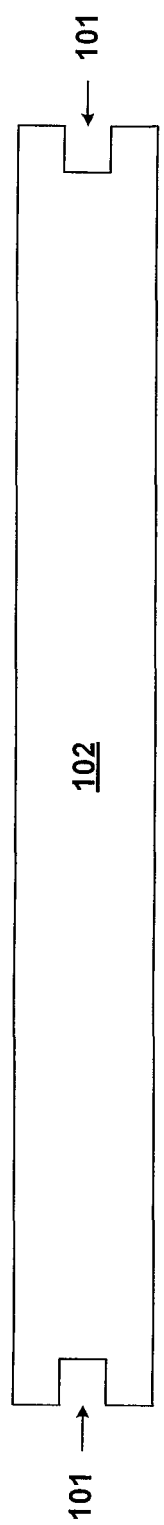
Fig. 9
Fig. 10

MEASUREMENT TOOL FOR SERVER RACK

BACKGROUND

The present invention generally relates to measuring server rack dimensions, and more particularly to the use of an adjustable sizing tool to measure server racks in data centers.

IBM Power Systems hardware is designed to be installed in primarily IBM designed rack enclosures with exact specifications for the rack width and depth to accommodate the drawer. In customer data centers, racks acquired from non-IBM suppliers often permit adjustment in the rack width and depth. While standard rack sizes exist, the specifications are nominal and actual measurements can vary by supplier and customer conventions and requirements.

SUMMARY

According to one embodiment of the present invention, a structure is provided. The structure may include a center spacer having a slider opening; a top panel fixed to a top surface of the center spacer; a bottom panel fixed to a bottom surface of the center spacer; and a slider in the slider opening of the center spacer, wherein a portion of the slider is between the top panel and the bottom panel, and the slider is horizontally movable between a starting position and an extended position, the starting position is where the slider is closest to the center of the center spacer and the extended position is where the slider is farthest from the center of the center spacer.

According to another embodiment of the present invention, a structure is provided. The structure may include a center spacer having a left opening and right opening on opposite sides of the center spacer; a top panel fixed to a top surface of the center spacer; a bottom panel fixed to a bottom surface of the center spacer; and a left slider in the left opening of the center spacer and a right slider in the right opening of the center spacer, wherein a portion of the left and right sliders are between the top panel and the bottom panel, the left and right sliders are horizontally movable between a starting position and an extended position, the starting position is where the left and right sliders are closest to the center of the center spacer and the extended position is where the left and right sliders are farthest from the center of the center spacer.

According to another embodiment of the present invention, a structure is provided. The structure may include a center spacer having a left slider opening on a left side of the center spacer and a right slider opening on a right side of the center spacer; a top panel fixed to a top surface of the center spacer; a bottom panel fixed to a bottom surface of the center spacer, wherein the bottom panel has a left stop opening and a right stop opening; and a left slider in the left slider opening, wherein the left slider includes a left slider panel, a left magnet on the left slider panel, a pin connected to the left slider panel, and a left stop mounted on the bottom surface of the left slider panel, wherein the left stop extends into the left stop opening of the bottom panel; and a right slider in the right slider opening, wherein the right slider includes a right slider panel, a right magnet on the right slider panel, a right pin connected to the right slider panel, and a right stop mounted on the bottom surface of the left slider panel, wherein the right stop extends into the right stop opening of the bottom panel.

BRIEF DESCRIPTION OF THE DRAWINGS

The following detailed description, given by way of example and not intended to limit the invention solely thereto, will best be appreciated in conjunction with the accompanying drawings, in which:

FIG. 6 is a partially assembled view of the adjustable sizing tool, according to an exemplary embodiment;

FIG. 7 is an assembled view of the adjustable sizing tool, according to an exemplary embodiment;

FIG. 9 is a top view and a front view of a center spacer, according to an exemplary embodiment;

FIG. 10 is a top view of a top panel, according to an exemplary embodiment;

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Figure 1:
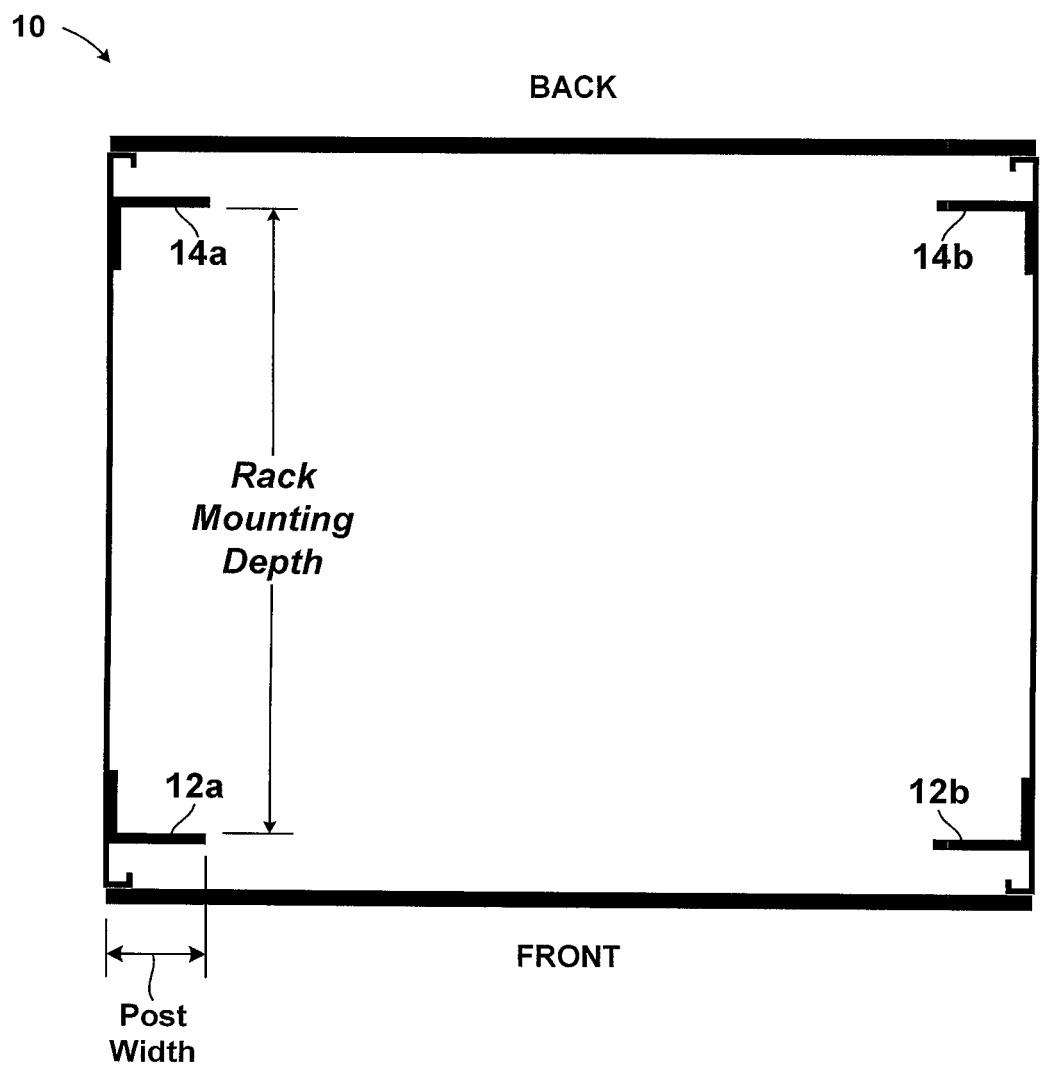
FIG. 1 is a top view of a rack, according to an exemplary embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of the description hereinafter, the terms "upper", "lower", "right", "left", "vertical", "horizontal", "top", "bottom", and derivatives thereof shall relate to the disclosed structures and methods, as oriented in the drawing figures. The terms "overlying", "atop", "on top", "positioned on" or "positioned atop" mean that a first element, such as a first structure, is present on a second element, such as a second structure, wherein intervening elements, such as an interface structure may be present between the first element and the second element. The term "direct contact" means that a first element, such as a first structure, and a second element, such as a second structure, are connected without any intermediary conducting, insulating or semiconductor layers at the interface of the two elements.

In the interest of not obscuring the presentation of embodiments of the present invention, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is rather focused on the distinctive features or elements of various embodiments of the present invention.

The present invention generally relates to measuring server rack dimensions, and more particularly to the use of an adjustable sizing tool to measure server racks in data centers.

Ideally, it may be desirable to install a system server or device into a compatible rack (preferably made by the same manufacturer). While many systems and racks are manufactured by different companies, standard size specifications are generally followed. However, when dimensions vary (even slightly), some systems may not be compatible or fully secured within the rack. One way to measure rack dimensions is to use an adjustable sizing tool to measure both the width and depth of a server rack. An embodiment of an adjustable sizing tool is described in detail below referring to the accompanying drawings FIGS. 1-14.

Figure 2:
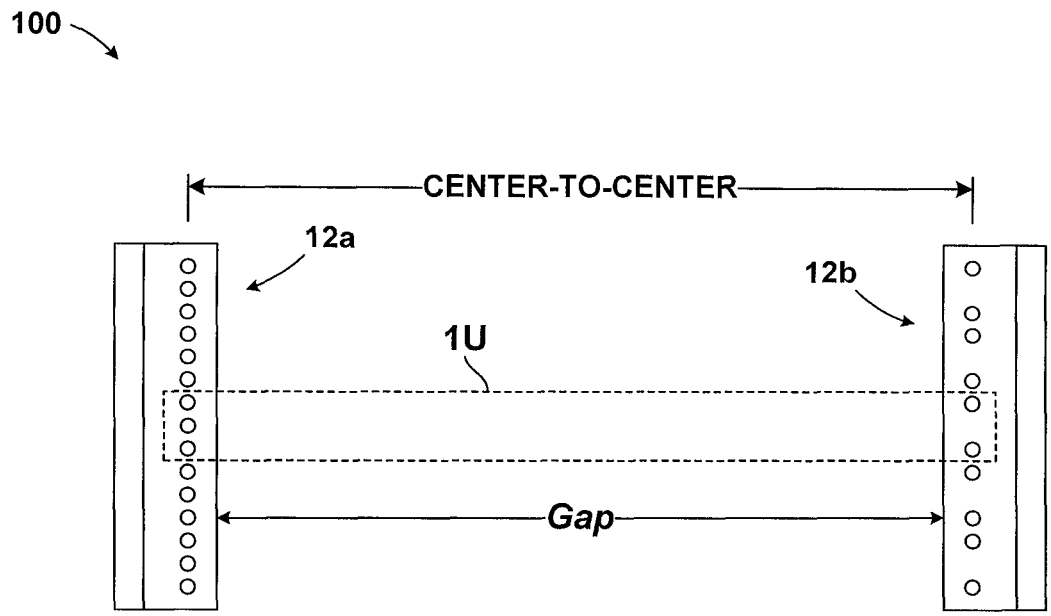
FIG. 2 is a front view of a rack, according to an exemplary embodiment.
Figure 3:
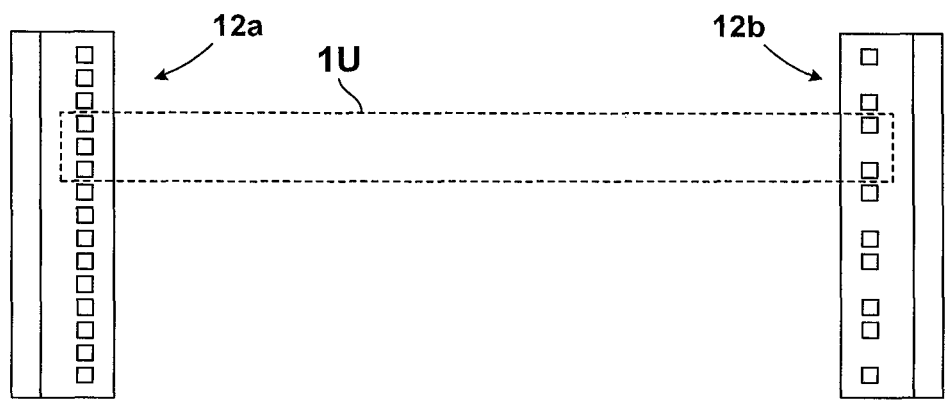
FIG. 3 is a front view of an alternative rack, according to an exemplary embodiment.

Referring now to FIGS. 1-3, a top view (FIG. 1) and two front views (FIGS. 2 and 3) of a server rack 10 is illustrated, according to an embodiment. More specifically, typical features and dimensions of a server rack are discussed.

Typically, a 19-inch rack is a standard structure for mounting one or more equipment modules, such as servers and systems. Each module has a front panel that is 19 inches wide, including edges or ears that protrude on each side which allow the module to be fastened to the rack frame. 19-inch racks hold most equipment in modern data centers, ISP facilities, and professionally designed corporate server rooms. Typically, a piece of equipment being installed has a front panel height 1/32 inch (0.031 inches or 0.787 millimeters) less than the allotted number of rack units (U's). Such that, a 1 U rack mount computer is not 1.75 inches (44.4 mm) tall but is 1.719 inches (43.7 mm) tall. 2 U would be 3.469 inches (88.1 mm) instead of 3.5 inches (88.9 mm). This gap allows a bit of room above and below an installed piece of equipment so it may be removed without binding on the adjacent equipment.

A rack's front mounting fixture consists of two parallel metal strips (also referred to as "posts" or "panel mounts") standing vertically, illustrated as front posts 12a, 12b in the figures. The posts are each 0.625 inches (15.88 mm) wide, and are separated by a gap of 17.75 inches (450.85 mm), giving an overall rack width of 19 inches (482.60 mm). The posts have holes in them at regular intervals, with both posts matching, so that each hole is part of a horizontal pair with a center-to-center distance of 18.312 inches (465.12 mm). The post holes may come in different shapes and sizes, such as, for example, threaded holes for #12-24 or #10-32 screws, tapped holes, or square holes.

FIG. 2 illustrates a rack with round holes and FIG. 3 illustrates a rack with square holes (two typical types of mounting designs). The server 10 has two back posts 14a, 14b with a gap similar to the front posts. The front posts 12a, 12b and back posts 14a, 14b are separated by a rack mounting depth. The rack mounting depth may vary for several reasons. In customer data centers, racks acquired from non-IBM suppliers often permit adjustment in the rack width and depth. While standard rack sizes exist, the specifications are nominal and actual measurements can vary by supplier and customer conventions and requirements. Setting the rack to a depth specified to support IBM enterprise servers supports ease of install and service of systems and avoids the need for reconfiguration should a longer depth system need to be installed. To adjust a rack mounting depth, or measure a set rack mounting depth, an adjustable sizing tool will be used and is described below.

Figure 4:
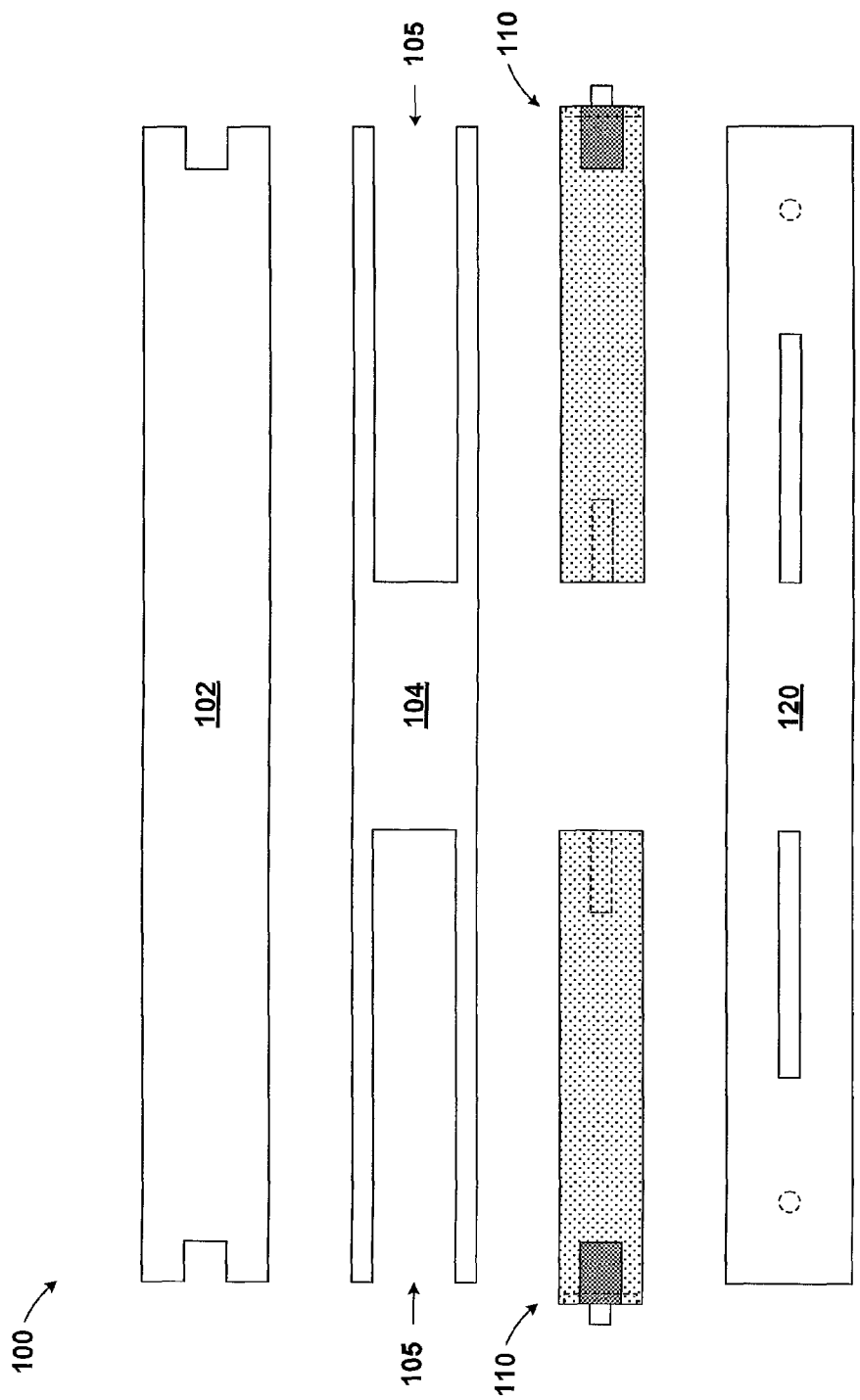
FIG. 4 is a top view of individual parts of an adjustable sizing tool, according to an exemplary embodiment.
Figure 5:
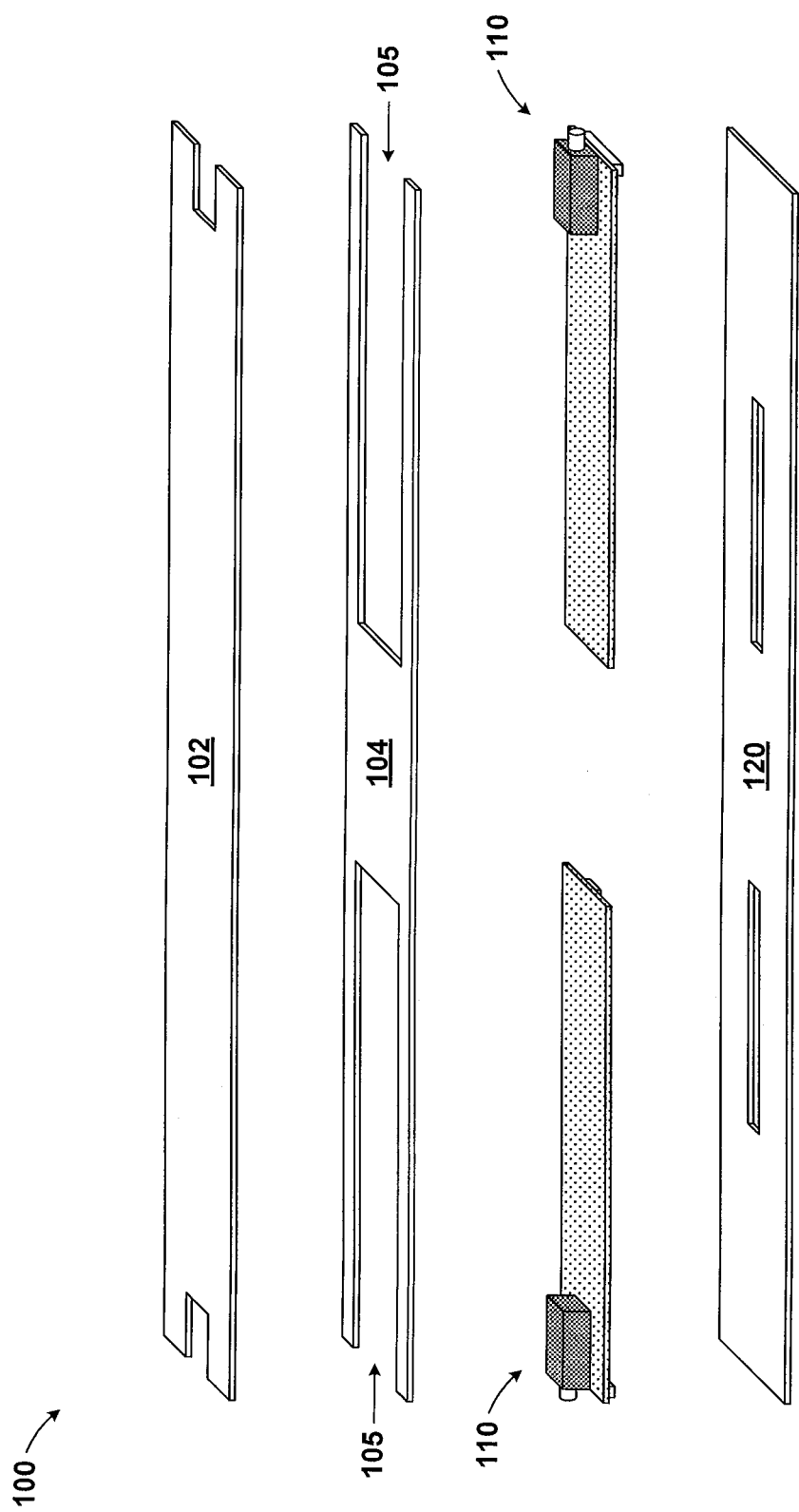
FIG. 5 is an exploded view of the adjustable sizing tool, according to an exemplary embodiment.

Now referring to FIGS. 4 and 5, a demonstrative illustration of a structure 100 is provided, according to an embodiment. More specifically, the illustrations depict a top view (FIG. 4) and an exploded view (FIG. 5) of individual pieces of structure 100.

Structure 100 is an adjustable sizing tool that may be used to measure center-to-center rack mounting widths and rack mounting depths. The individual pieces of structure 100 may be any material known in the art, such as aluminum. In the illustrated embodiment, structure 100 has five parts, including; a top panel 102, a center spacer 104, two sliders 110 (a left slider and a right slider) and a bottom panel 120. The two sliders 110 will be placed in respective (left and right) slider openings 105 (described further with reference to FIG. 6).

Now referring to FIGS. 6 and 7, a partially assembled view of structure 100 (FIG. 6) and an assembled view of structure 100 (FIG. 7) are provided, according to an embodiment. More specifically, the partially assembled view depicts the sliders 110 in the respective slider openings 105, whereas the assembled view depicts the structure 100 after assemble, according to an embodiment. FIGS. 6 and 7 are provided to illustrate the arrangement of an assembled structure 100; the individual parts, characteristics, dimensions, and other features are described below.

Figure 8:
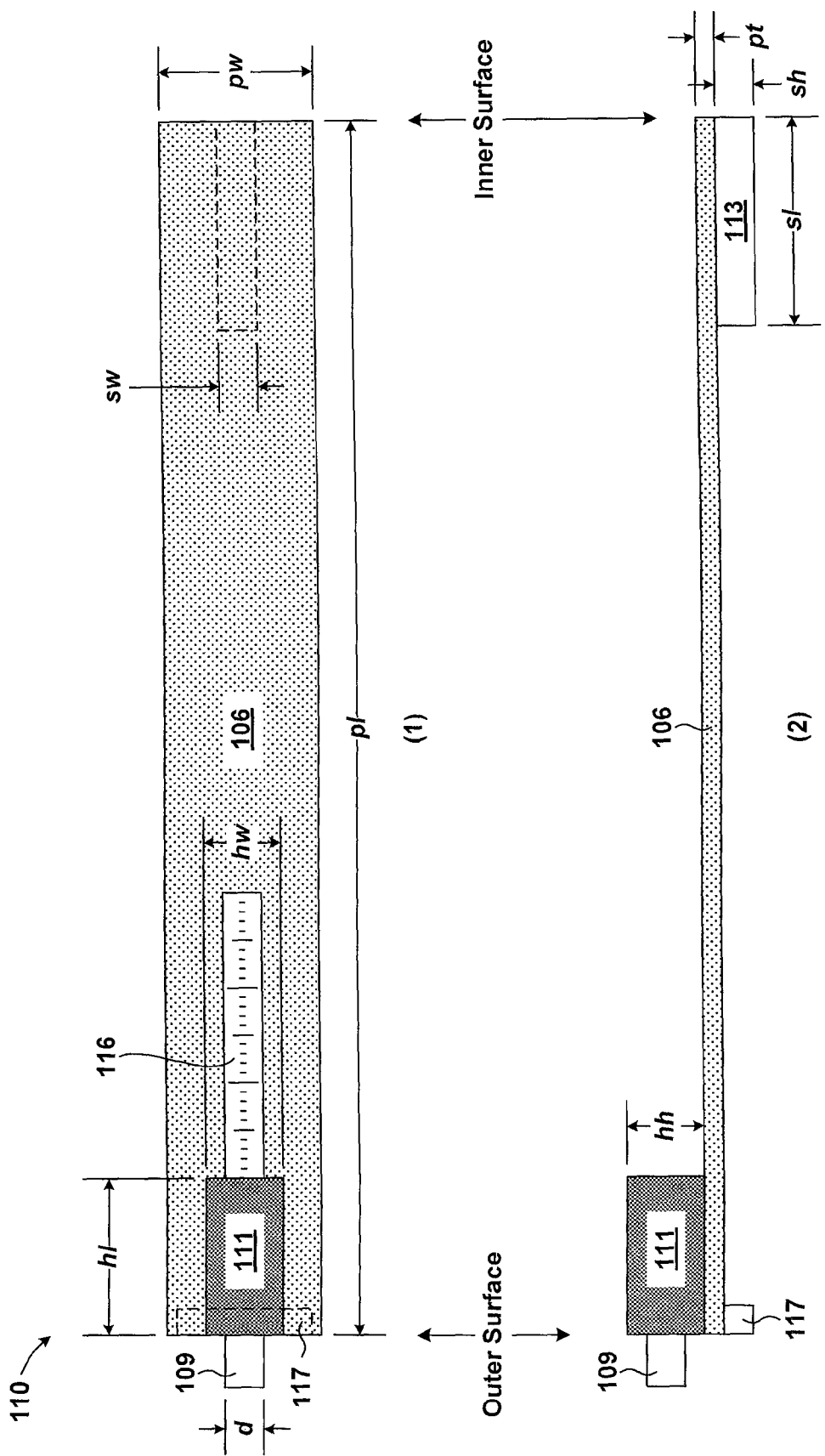
FIG. 8 is a top view and a front view of a slider, according to an exemplary embodiment.

Now referring to FIG. 8, aspects of the sliders 110 are illustrated, according to an embodiment. More specifically, a top view (1) and front view (2) are provided to illustrate locations and features of slider parts. It should be noted, only one slider is illustrated for demonstrative purposes, however, the left and right sliders may have the same features and dimensions.

In an embodiment, the sliders 110 are the 'adjustable' pieces of the structure 100. The slider parts may include: a slider panel 106, a pin holder 111, a pin 109, a magnet 117 and a stop 113. The slider panel 106 has: a panel length (pl) ranging from about 8.85 inches to about 10 inches, a panel width (pw) ranging from about 0.9 inches to about 1 inch, and a panel thickness (pt) ranging from about 0.1 inches to about 0.15 inch, but other panel dimensions may be used. A measurement graphic 116 may be used to display a measured distance between pin holders 111. The measurement graphic 116 can be digital, printed, or displayed in any manor to relay the distance to a user.

The stop 113 has: a stop length (sl) ranging from about 0.95 inches to about 1 inch, a stop width (sw) ranging from about 0.15 inches to about 0.45 inches, and a stop height (sh) ranging from about 0.1 inches to about 0.15 inches, but other stop dimensions may be used. The stop 113 is fixed to the bottom surface of the slider panel 106. Additionally, the stop 113 and slider panel 106 may have a coplanar inner surface, however, the stop 113 can be placed anywhere on the slider panel 106. The stop 113 can be used to stop the slider 110 at a starting and at an extended position, as will be described below.

The magnet 117 may be fixed to the bottom surface of the slider panel 106. The magnet may be any magnetic material known in the art, such that a magnetic field will attract the magnet 117 to the server rack posts as will be described further below. It should be noted, the magnet can be placed anywhere on the slider 110, such that the magnet is capable of extending to within the magnetic field of the server rack posts.

In the present embodiment, the pin holder 111 is a block that connects the pin 109 to the slider panel 106, however, any structure or method may be used to connect the pin 109 to the slider panel 106. The pin holder 111 has: a holder length (hl) ranging from about 0.35 inches to about 0.75 inches, a holder width (hw) ranging from about 0.4 inches to about 0.75 inches, and a holder height (hh) ranging from about 0.35 inches to about 0.5 inches, but other pin holder dimensions may be used. The pin holder 111, slider panel 106 and the magnet 117 may have a coplanar outer surface.

The pin 109 has a diameter (d) that is designed to fit respective server rack post holes. In an embodiment, the pin diameter (d) is about 0.3 inches. The pin 109 is fixed to the center of the outer surface of the pin holder 111.

Now referring to FIG. 9, aspects of the center spacer 104 are illustrated, according to an embodiment. More specifically, a top view (1) and front view (2) are provided to illustrate features and dimensions of the center spacer 104.

The center spacer 104 has slider openings 105 on opposite sides of the center spacer 104. The slider openings 105 have opening widths (ow) of about 1 inch, but other widths may be used such that the sliders 110. The opening widths (ow) should be slightly larger than the panel width (pw) to allow for free horizontal movement of the sliders 110 within the slider opening 105.

As described above, the assembled structure includes the top and bottom panels 102, 120 being fixed to the top and bottom surfaces of the center spacer 104, respectively. The top and bottom panels 102, 120 may be fixed to the center spacer 104 using a pressure sensitive adhesive. The pressure sensitive adhesive may be applied to the top and bottom surfaces of the center spacer 104. The center spacer 104 has a center spacer thickness (ct) ranging from about 0.1 inches to about 0.15 inch, but other thicknesses may be used. The center spacer thickness (ct), including the pressure sensitive adhesive, should be slightly greater than the panel thickness (pt) to allow for free horizontal movement of the sliders 110 after assembly.

Now referring to FIG. 10, aspects of the top panel 102 are illustrated, according to an embodiment. More specifically, the illustration depicts two holder openings 101 (a left and a right holder opening) that are on opposite sides of the top panel 102. The top panel 102 may need additional space on to accommodate the pin holder 111 to allow the sliders 110 to reach a desired starting position in the assembled structure. If additional space is need, the width of the holder openings 101 can be slightly larger than the pin holder width (hw).

Figure 11:
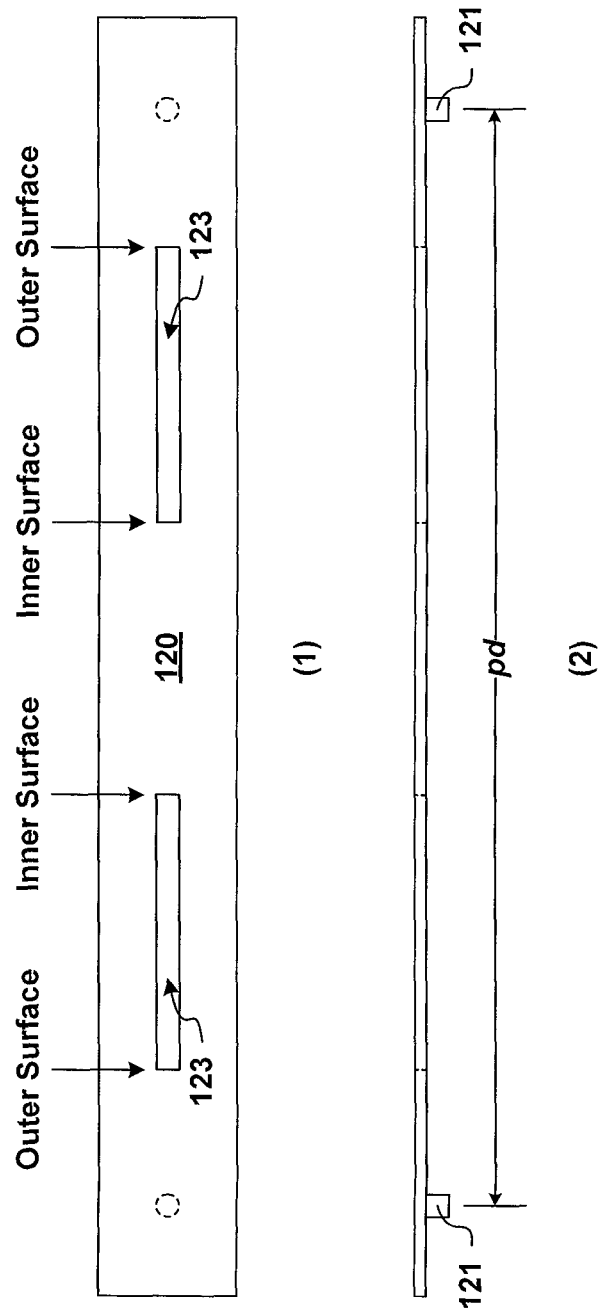
FIG. 11 is a top view and a front view of a bottom panel, according to an exemplary embodiment.

Now referring to FIG. 11, aspects of the bottom panel 120 are illustrated, according to an embodiment. More specifically, the illustration includes a top view (1) and a front view (2) depicting features and parts of the bottom panel 120 including two stop openings 123 and two fixed pins 121.

As described above, the sliders 110 should be able to move freely in the horizontal direction from a starting position to an extended position, once assembled. The stop openings 123 may be slightly wider than the width of the stops (sw), such that the stops 113 fit in the stop openings 123 in the assembled structure. The stop openings 123 can be designed to define the starting and extended positions of the sliders 110, such that an inner surface defines the starting position and an outer surface defines the extend position.

The fixed pins 121 may be used as a quick reference to measure center-to-center distances of front posts on a rack. The standard center-to-center distance is 18.312 inches, as described above. Therefore, the fixed pins 121 may have a pin distance (pd), between the centers of the pins 121, equal to about 18.312 inches. The fixed pins 121 can be used as a quick "go no-go" tool to determine whether the front posts are properly aligned.

Figure 12:
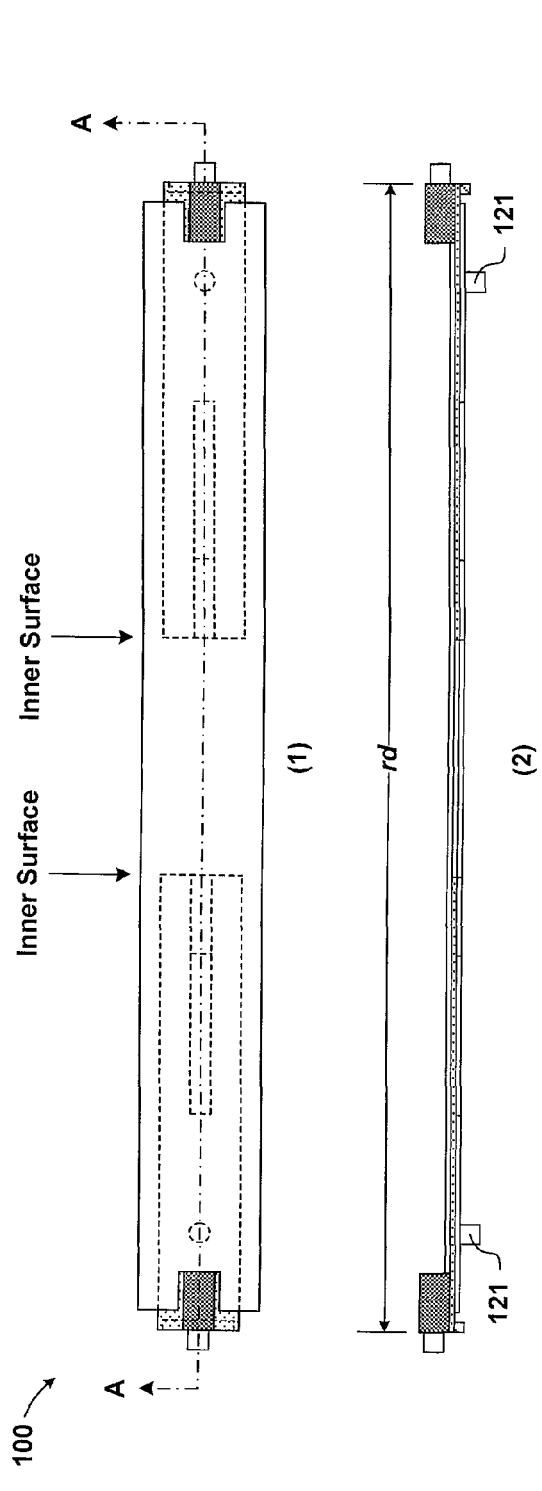
FIG. 12 is a top view and a cross-sectional view of the adjustable sizing tool in a starting position, according to an exemplary embodiment.
Figure 13:
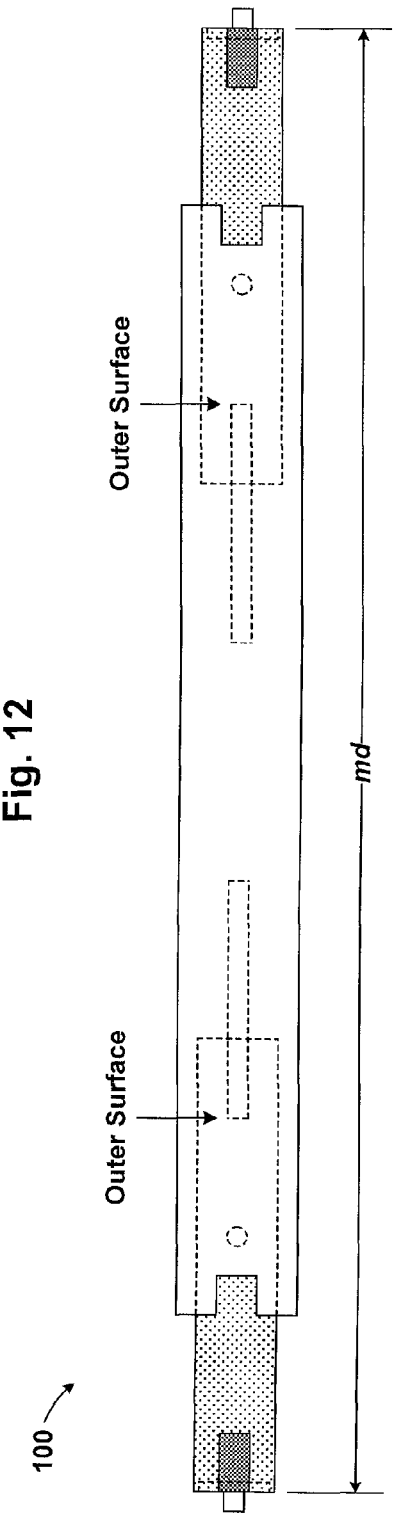
FIG. 13 is a top view of the adjustable sizing tool in a fully extended position, according to an exemplary embodiment.

Now referring to FIGS. 12 and 13, the assembled structure is illustrated at the starting position (FIG. 12) and the extended position (FIG. 13). FIG. 12 includes a top view (1) and a cross-sectional front view (2) of the assembled structure. The cross-sectional view (2) is taken along section line A-A.

At the starting position, the sliders 110 are completely retracted towards the center of the structure 100, such that the stops 113 are in contact with the inner surface of the stop openings 123. At the starting position, the structure 100 has a reference distance (rd) between the outside surfaces of the pin holders 111 equal to about 20.1 inches.

At the extended position, the sliders 110 are completely extended outward from the center of the structure 100, in the horizontal direction, such that the stops 113 are in contact with the outer surface of the stop openings 123. At the extended position, the structure 100 has a maximum distance (md) between the outside surfaces of the pin holders 111 equal to about 28.5 inches, but other maximum extended distances may be used.

Figure 14:
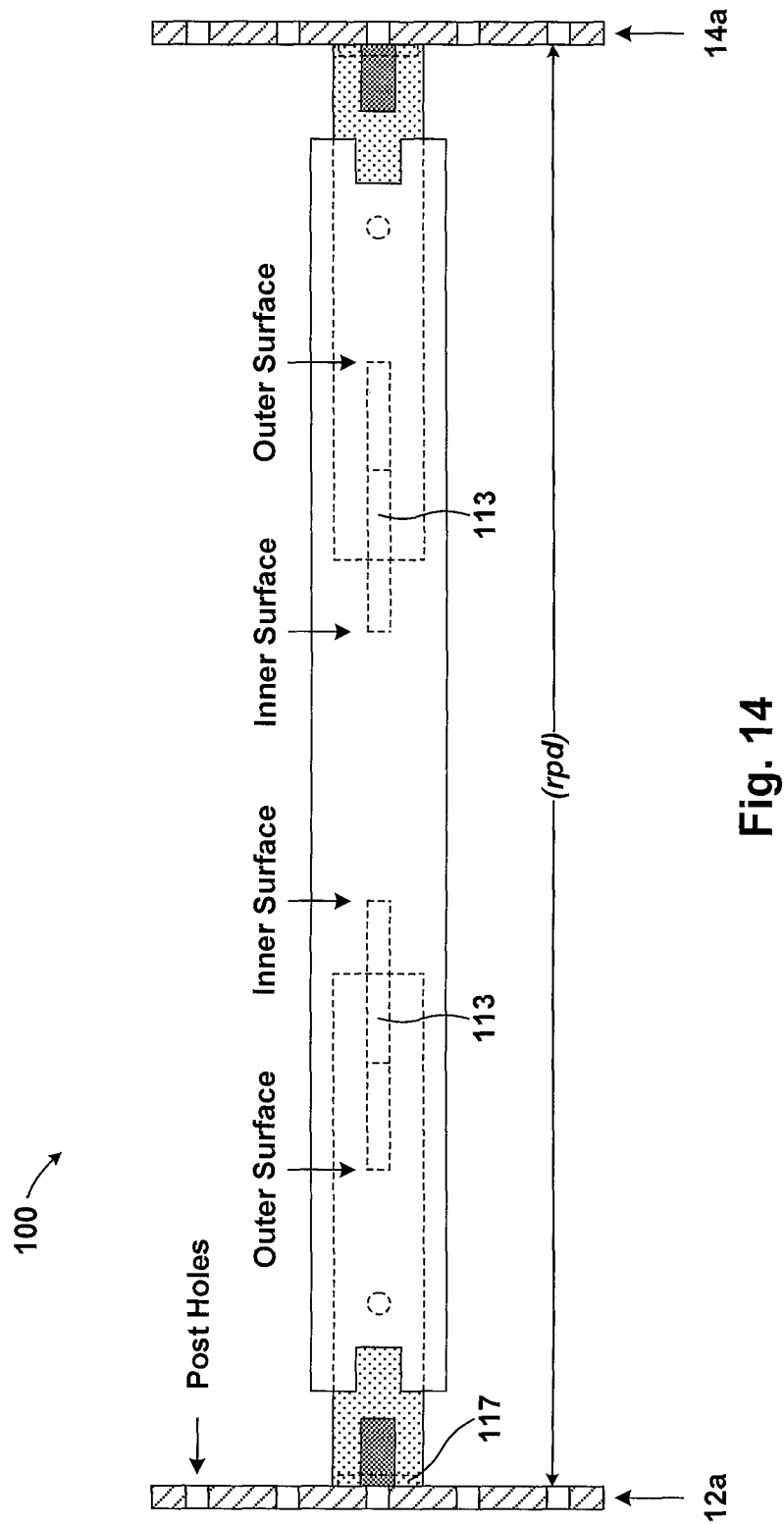
FIG. 14 illustrates the adjustable sizing tool in a measurement position between front and back rack posts, according to an exemplary embodiment.

Now referring to FIG. 14, the structure 100 is illustrated in a measurement position, according to an embodiment. More specifically, the structure 100 is in a position to measure a rack post depth (rpd), wherein the rack post depth (rpd) is the distance between the front rack post 12a and the back rack post 14a. The rack post depth (rpd) is shown as the rack mounting depth in FIG. 1.

When the structure 100 is used to measure the distances between server posts, the pins 109 may be inserted into the post holes such that the outer surfaces of the slider panels 106 touch the post walls. The magnet 117 may be magnetic in such a way to stick to the server posts to allow for more accurate readings of post distances. The measured distance may be read as graphical icons printed on the slider panels 106 or a digital reading. As seen in the figure, the measured rack post depth (rpd) is between the starting position and the extended position, such that the stops 113 are somewhere between the inner and outer surfaces of the stop openings 123.

Figure 15:
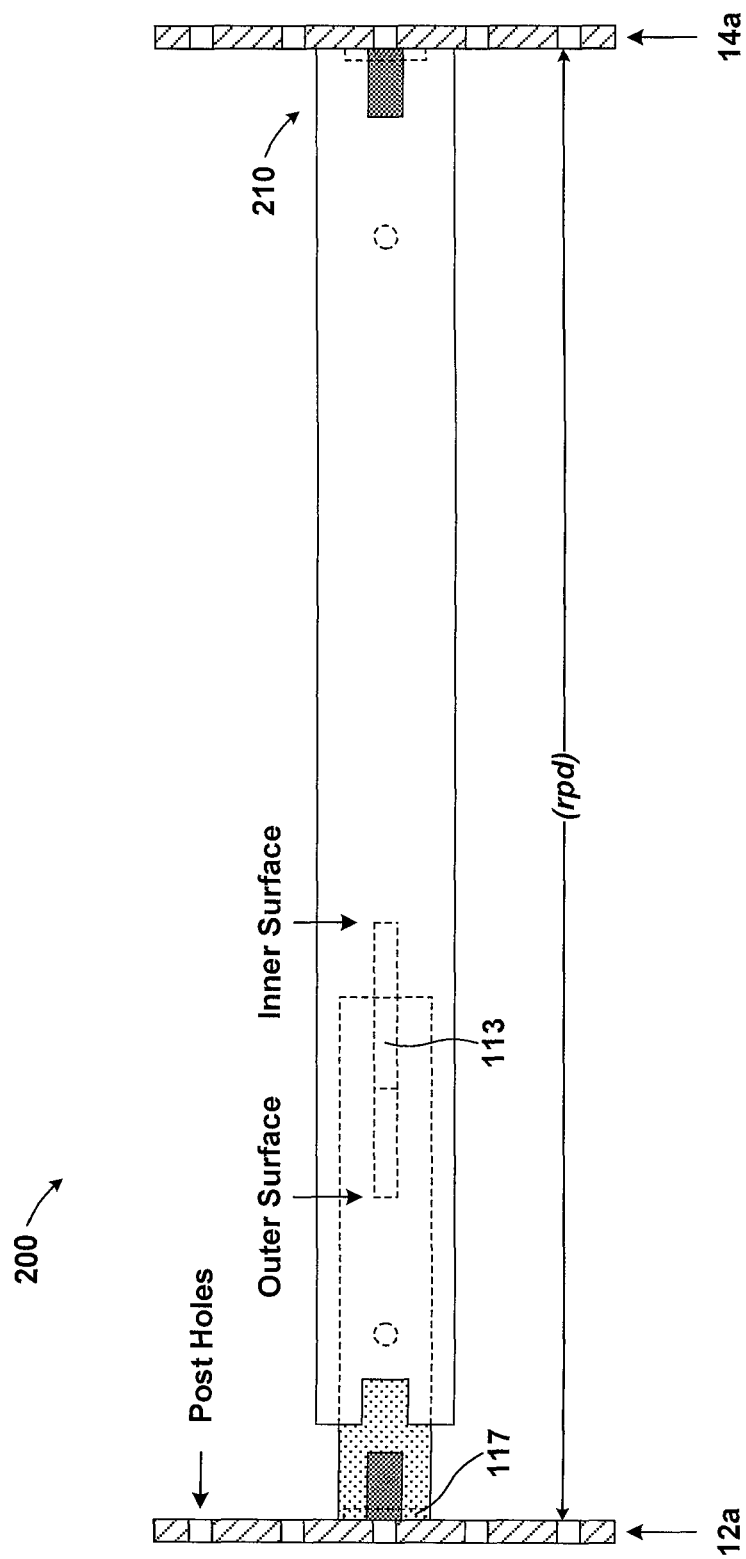
FIG. 15 illustrates an alternative adjustable sizing tool having one slider and one fixed connector, according to an exemplary embodiment.

Now referring to FIG. 15, an alternative structure 200 is illustrated, according to an embodiment. More specifically, structure 200 may only have one slider (illustrated on the left side) and a fixed structure 210 on the opposite side.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. An apparatus for measuring rack post distances comprising:
   a center spacer having a slider opening;
   a top panel fixed to a top surface of the center spacer;
   a bottom panel fixed to a bottom surface of the center spacer; and
   a slider in the slider opening of the center spacer, wherein a portion of the slider is between the top panel and the bottom panel, and the slider is horizontally movable between a starting position and an extended position, the starting position is where the slider is closest to the center of the center spacer and the extended position is where the slider is farthest from the center of the center spacer.

2. The apparatus of claim 1, wherein the slider includes a slider panel, a stop mounted on the bottom surface of the slider panel, a magnet mounted on the bottom surface of the slider panel, a pin holder mounted on the top surface of the slider panel and a pin mounted on an outer surface of the pin holder.

3. The apparatus of claim 2, wherein the stop extends into stop openings in the bottom panel and the stop openings define the starting position and the extended position.

4. The apparatus of claim 1, wherein the top panel and the bottom panel are fixed to the center spacer using a pressure sensitive adhesive.

5. The apparatus of claim 1, wherein the bottom panel has two fixed pins, wherein the distance between the two fixed pins is about 18.3 inches.

6. The apparatus of claim 1, wherein a measurement graphic is on a visible surface of the slider, the measurement graphic displays the distance between an outside edge of the slider and an opposite edge of the apparatus.

7. An apparatus for measuring server racks comprising:
   a center spacer having a left opening and right opening on opposite sides of the center spacer;
   a top panel fixed to a top surface of the center spacer;
   a bottom panel fixed to a bottom surface of the center spacer; and
   a left slider in the left opening of the center spacer and a right slider in the right opening of the center spacer, wherein a portion of the left and right sliders are between the top panel and the bottom panel, the left and right sliders are horizontally movable between a starting position and an extended position, the starting position is where the left and right sliders are closest to the center of the center spacer and the extended position is where the left and right sliders are farthest from the center of the center spacer.

8. The apparatus of claim 7, wherein the left and right sliders each include a slider panel, a stop mounted on the bottom surface of the slider panel, a magnet mounted on the bottom surface of the slider panel, a pin holder mounted on the top surface of the slider panel and a pin mounted on an outer surface of the pin holder.

9. The apparatus of claim 8, wherein the stops extend into stop openings in the bottom panel and the stop openings define the starting position and the extended position.

10. The apparatus of claim 7, wherein the top panel and the bottom panel are fixed to the center spacer using a pressure sensitive adhesive.

11. The apparatus of claim 7, wherein the bottom panel has two fixed pins, wherein the distance between the two fixed pins is about 18.3 inches.

12. The apparatus of claim 7, wherein a measurement graphic is on a visible surface of the left and right sliders, the measurement graphic displays the distance between opposite edges of the left and right sliders.

13. An apparatus for measuring the distance between two server rack posts, the apparatus comprising:
   a center spacer having a left slider opening on a left side of the center spacer and a right slider opening on a right side of the center spacer;
   a top panel fixed to a top surface of the center spacer;
   a bottom panel fixed to a bottom surface of the center spacer, wherein the bottom panel has a left stop opening and a right stop opening; and
   a left slider in the left slider opening, wherein the left slider includes a left slider panel, a left magnet on the left slider panel, a pin connected to the left slider panel, and a left stop mounted on the bottom surface of the left slider panel, wherein the left stop extends into the left stop opening of the bottom panel; and
   a right slider in the right slider opening, wherein the right slider includes a right slider panel, a right magnet on the right slider panel, a right pin connected to the right slider panel, and a right stop mounted on the bottom surface of the left slider panel, wherein the right stop extends into the right stop opening of the bottom panel.

14. The apparatus of claim 13, further comprising:
   two fixed pins on the bottom surface of the bottom panel.

15. The apparatus of claim 14, wherein the two fixed pins are separated by a distance of about 18.3 inches.

16. The apparatus of claim 13, wherein the left and right sliders are movable between a starting position and an extended position, wherein the starting position is where the left and right sliders are closest to the center of the center spacer and the extended position is where the left and right sliders are farthest from the center of the center spacer.

17. The apparatus of claim 16, wherein the starting and extended positions are defined by the left and right stop openings.

18. The apparatus of claim 16, wherein a reference distance is equal to about 20.1 inches, wherein the reference distance is the distance between the left pin and the right pin at the starting position.

19. The apparatus of claim 16, wherein a maximum extended distance is equal to about 28.5 inches, wherein the extended distance is the distance between the left pin and the right pin at the extended position.

20. The apparatus of claim 13, wherein the distance between the left pin and the right pin is displayed as a graphical icon located on a visible surface of the left and right sliders.

* * * * *